United States Patent [19]
Shimizu et al.

[11] Patent Number: 5,827,469
[45] Date of Patent: *Oct. 27, 1998

[54] METHOD OF MAKING A MOLDED PRODUCT HAVING A FUNCTIONAL FILM THE PRODUCT AND APPARATUS FOR MAKING THE PRODUCT

[75] Inventors: Kaoru Shimizu, Osaka; Kazuhiko Kodama, Kyoto, both of Japan

[73] Assignee: Matsushita Electric Industrial Co., Ltd., Osaka, Japan

[ * ] Notice: The term of this patent shall not extend beyond the expiration date of Pat. No. 5,753,174.

[21] Appl. No.: 628,550

[22] Filed: Apr. 10, 1996

[30] Foreign Application Priority Data

| Apr. 10, 1995 | [JP] | Japan | 7-838875 |
| Jun. 2, 1995 | [JP] | Japan | 7-136437 |
| Jul. 29, 1995 | [JP] | Japan | 7-193027 |

[51] Int. Cl.$^6$ .................................................. B29C 49/46
[52] U.S. Cl. ........................................... 264/512; 264/515
[58] Field of Search ..................................... 264/512, 515, 264/526

[56] References Cited

U.S. PATENT DOCUMENTS

| 3,312,762 | 4/1967 | Wechsler et al. | 264/515 |
| 4,617,077 | 10/1986 | Giese et al. | 264/526 |
| 5,093,053 | 3/1992 | Eckardt et al. | |
| 5,472,746 | 12/1995 | Miyajima et al. | |

FOREIGN PATENT DOCUMENTS

| 4202306 | 8/1992 | Germany . |
| 4240017 | 6/1994 | Germany . |
| 58-134721 | 8/1983 | Japan . |
| 61-24306 | 2/1986 | Japan . |
| 61-197221 | 9/1986 | Japan ..................................... 264/515 |
| 3-196697 | 8/1991 | Japan . |
| 5-8287 | 1/1993 | Japan . |
| 52-20777 | 8/1993 | Japan . |
| 5-259682 | 10/1993 | Japan . |
| 5-318562 | 12/1993 | Japan . |
| 06-204678 | 7/1994 | Japan . |
| 2218937 | 11/1989 | United Kingdom . |

OTHER PUBLICATIONS

N. Shinbun, "Foil Formed from Liquid Material", Samco Develops New System, news item, Jun. 17, 1995 (with English translation).

European Search Report dated Jan. 25, 1996 for application EP 95 30 6760.

*Primary Examiner*—Catherine Timm
*Attorney, Agent, or Firm*—Ratner & Prestia

[57] ABSTRACT

Molding methods for disposing a functional film on a hollow inner surface or undulated surface. A blow molding process for manufacturing a molded product having a hollow part and a pressure forming process for manufacturing a molded product having an undulated part, and the products produced there from. Before the parison or forming material is cooled and solidified, a compressed fluid containing a material for forming a film is supplied into a die, thereby forming a film simultaneously when molding.

6 Claims, 12 Drawing Sheets

METHOD OF MAKING A MOLDED PRODUCT HAVING A FUNCTIONAL FILM THE PRODUCT AND APPARATUS FOR MAKING THE PRODUCT

BACKGROUND OF THE INVENTION

The present invention relates to a method for molding plastic material, resin material, glass material, or the like into a specified shape by blow molding or pressure forming, the product formed thereby, and the apparatus for making the product.

Housings and structures for electronic appliances such as television receivers, office automation appliances such as copiers, automotive parts and the like have recently been manufactured by means such as blow molding and pressure forming. Beverage containers also are manufactured by blow molding or pressure forming by using glass materials or plastic materials.

For example in a container manufacturing method, the gas barrier properties and mechanical strength of a hollow container can be enhanced by blow molding accompanied by drawing of the plastics, and is proposed in Japanese Laid-open Patent No. 5-8287.

The housing for an electronic appliance, for example, as set forth in Japanese Laid-open Patent No. 3-196697, can be manufactured by forming a molded housing product from a hollow double wall structure by blow molding, and applying an electromagnetic wave shielding material to the inner surface of the molded product. In this construction the method of manufacturing, makes it difficult to apply paint to the inner surface of the hollow molded product because of the complex shape. It is also difficult or impossible to handle a flexible housing having a complex shape such as that of an electronic appliance. In addition to requiring a molding process to form a hollow molded product, the manufacturing process requires application of an electromagnetic wave shielding material which increases the manufacturing cost of the process.

The method of disposing an electromagnetic wave shielding material on the inner surface of the hollow part of the molded product, for example, may include injecting a conductive paint into the hollow part after cooling and solidifying the molded resin as proposed in Japanese Laid-open Patent No. 5-259682. In this method, however, the molding cycle is long which impairs the productivity of the process.

Moreover, by injection molding of a resin material mixed with a conductive material (conductive filler), a manufacturing method of forming a structural member having various electromagnetic wave shielding functions has been proposed. In this case, too, the molding performance of the resin material is decreased. For example, the ability of the resin to flow is decreased, or the surface quality of the molded product is poor.

SUMMARY OF THE INVENTION

It is an object of the invention to present a simplified molding method for forming a high quality and inexpensive functional film on the undulated side of a molded product or on the inner side of a hollow part, the apparatus, and the product itself.

The molding method of the invention includes using a compressed fluid containing a film-forming-material (a material for forming a film) in a blow molding process or pressure forming process, and thereby forming a functional film on the surface of the undulated part or inner surface of the hollow part, simultaneously or in parallel with forming the shape of a molded product.

The present invention includes a blow molding method for manufacturing a hollow molded product having a film and includes supplying a plasticized parison into a die, feeding a compressed fluid containing a film-forming-material into the parison, and forming a film on the surface of the hollow part. The present invention also includes a blow molded product having a hollow part manufactured by such a molding method.

The present invention also includes a pressure forming method for manufacturing a molded product having undulations having a film and includes softening a molding material disposed at a specified position in a die, feeding a compressed fluid containing a film-forming-material into the die, and forming a film on the surface of the undulated part of a molded product. The method also includes a process of forming a molded product having undulations. The present invention also includes a pressure formed product manufactured by such a forming method.

A blow molding apparatus of the invention for manufacturing a hollow molded product having a film includes means for feeding a parison, a die for holding the parison and forming a molded shape, and means for feeding a film-forming-material in an inside region of the parison.

A pressure forming apparatus of the invention for manufacturing a formed product having undulations and a film includes a die for holding a forming material, wherein the die softens the forming material, and forms the forming material into a shape, and means for feeding a film-forming-material into the die. The forming material is pressed and formed in a forming process, and at the same time, the film is placed on the surface of the undulated part.

The above method and apparatus results in the following effects. A molded product of complex shape and having a functional film is obtained. Because the functional film is formed simultaneously or in parallel with the molding process for forming the molding material having undulations, or with the molding-material formed with the parison having a hollow part, the additional step of forming the film is not necessary. Therefore, the manufacturing process is simple and the manufacturing cost is reduced. For a blow molded product, because the film is formed inside of the hollow part of the molded product, the appearance is not changed by the film, and peeling of the film due to scratching or the like may be prevented. It is not necessary to modify the molding material itself used in molding in order for the film to function properly. Also, the functional film can be formed at the same time without changing the characteristics of the molding itself. A film having a smooth surface can be formed on the surface of the undulated part or on the inner surface of the hollow part.

DESCRIPTION OF REFERENCE NUMERALS FOR THE DRAWINGS

Figure 1:
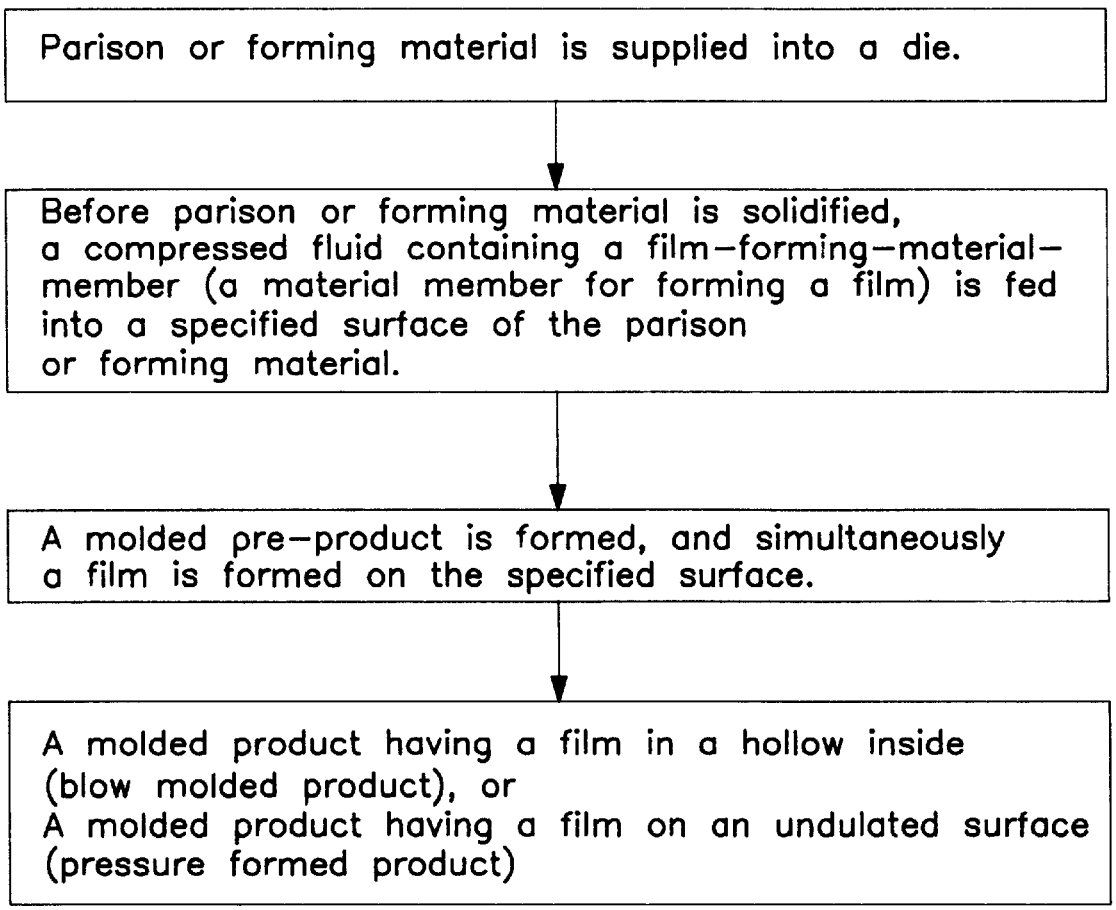
FIG. 1 is a flow chart of the blow molding and pressure forming processes according to the invention.

1 Split die
2 Extruder
3 Movable die
4 Extrusion head
5 Cavity
6 Pinch off part
7 Parison
8 Housing
9 Hollow part
10 Conductive terminal pin
11 Burr
13 Thermoplastic resin
21 Compressed fluid containing film forming material member (material member for forming a film)
30 Pump
32 Blow pin
33 Source of compressed gas
41 Stationary die
42 Movable die
43 Device for feeding compressed fluid
44 Feed tube
45 Recess
46 Heater
47 Molding material
48 Air vent
50 Molded product
60 Parabolic antenna
61 Reflector
62 Converter
63 Support pole
70 Conductive film
71 Protective film
73 Substrate
81 Extrusion head
82 Parison
83 Split die
100 Film
101 Film
200 Molded product
201 Film

DETAILED DESCRIPTION OF THE INVENTION

A molded product according to the invention having a hollow or undulated part is manufactured by the following processes.

FIG. 1 is a flow chart showing one embodiment of a process for manufacturing hollow or undulated part. The process includes, first supplying a parison or molding material into a die. Then, before the parison or molding material is solidified, a compressed fluid containing a film-forming-material (a material for forming a film) is supplied. By these steps, a molded pre-product is formed, and at the same time, a blow molded product having a film on the inner surface of the hollow part, or a pressure formed product having a film on the surface of the undulated part is manufactured.

Figure 2:
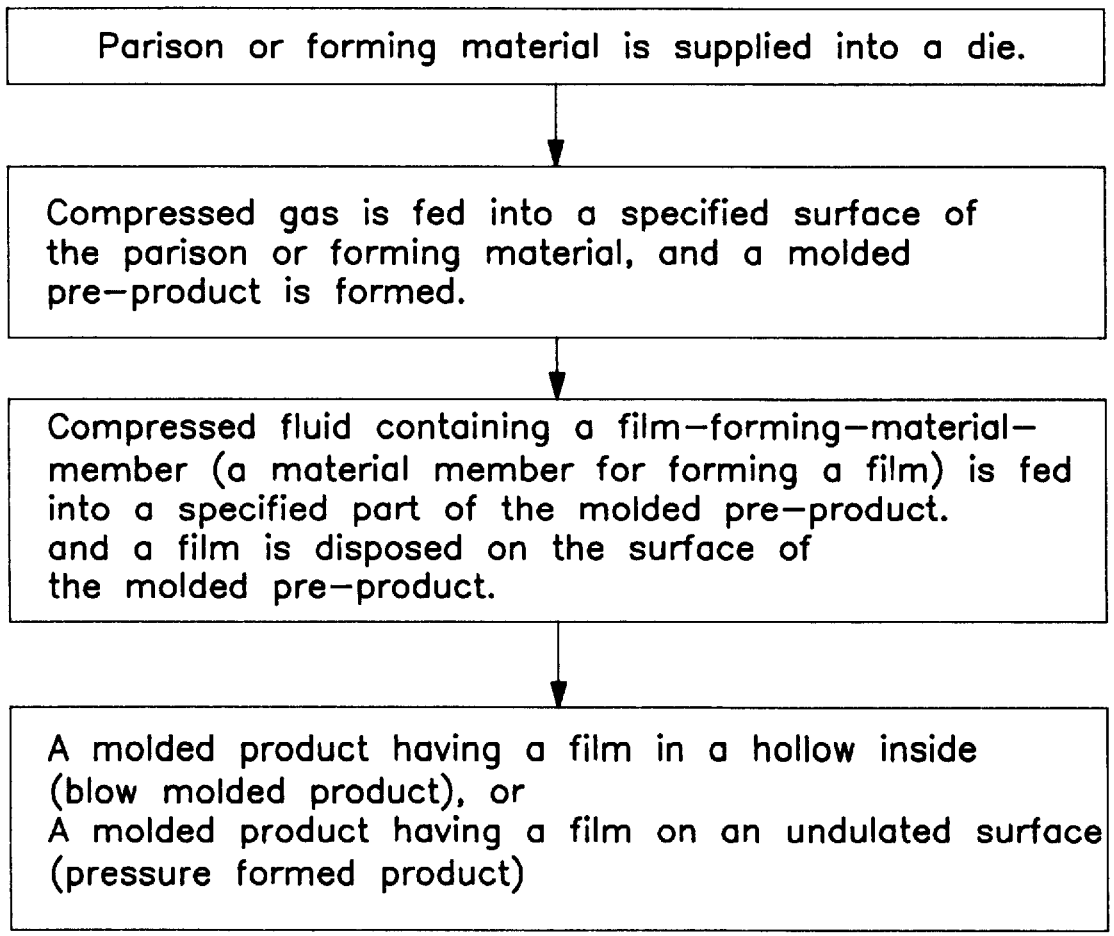
FIG. 2 is a flow chart of other blow molding and pressure forming processes according to the invention.

FIG. 2 is a flow chart showing another embodiment of a process for manufacturing a hollow or undulated part. The process includes, first supplying a parison or molding material into a die. Then, a compressed gas is introduced into the inner surface of the parison or the surface of the molding material, and a molded pre-product having a specified shape is formed. Afterwards, before the molded pre-product is solidified, a compressed fluid containing a film forming material is supplied, and a film is formed on the surface of the molded pre-product. In this way, a blow molded product having a film on the inner surface of hollow part, or a pressure formed product having a film on the surface of the undulated part is manufactured.

Specific forming methods of the invention include blow molding and pressure forming methods. The blow molding method is a manufacturing method for molding a product having a hollow part and placing a functional film on the inner surface of the hollow part. Another blow molding method for manufacturing a molded product having a functional film layer in the inside is the pressure forming method. The pressure forming method produces a formed product having a functional film on the surface of the undulated part. As used herein the term "pressure forming" means a forming a material by the pressure of compressed air.

The blow molding method of the invention is executed by the following process. A plasticized, tubular parison is supplied into a split die. Then, before the parison is solidified, a compressed fluid containing a functional film-forming-material (a material for forming a functional film) is fed into the hollow part of the parison. A hollow molded pre-product is formed by the pressure of the compressed fluid, and a functional film is disposed on the hollow inner surface at the same time. Then, the molded product is solidified by cooling or curing. Following these steps, a molded product having a film on a hollow inner surface is produced.

The pressure forming method of the invention is executed by the following process. A forming material is disposed at a specified position in a die. Then the forming material is softened. Before the forming material is solidified, a compressed fluid containing a functional film-forming-material (a material for forming a functional film) is fed onto the surface of the forming material. A molded pre-product having undulations is formed by the pressure of the compressed fluid, and a functional film is disposed on the surface of the undulated part at the same time. Then, the molded product is solidified by cooling or curing Following these steps, a formed product having a film on an undulated surface is produced.

The molded pre-product is a molded product before being solidified, and is obtained by molding the parison or forming material in a die.

The forming material is not particularly limited, but a tubular parison is used in blow molding, and a plate or film sheet material is used in pressure forming. The types of forming material are not particularly limited. Examples of the forming material include copolymer resins of acrylonitrile, butadiene and styrene, polystyrene resin, polypropylene resin, polyacrylic resin, polyethylene resin, polyester resin, other thermoplastic resin members, epoxy resin, other thermosetting resins, ceramic, glass, and other inorganic materials. Furthermore, biodegradable plastics also can be used as forming materials. Examples include gluten and other denatured protein materials, kneaded forms of paper and denatured protein, agar materials, potato starch kneaded in water, natural macromolecular Novamont (tradename Materby, Japan Synthetic Chemical Industrial Co.), microorganism producing polyester (tradename Biopol, ICI Japan), and chemically synthesized aliphatic polyester (tradename Bionol, Showa Polymer CO.). These forming materials are plasticized or softened by heating or other means. The molded pre-product is solidified, for example, by cooling. When using a thermosetting resin, it can be solidified by curing.

The film-forming-material includes solids (for example, a powder, granules, flakes, or colloid), liquids (for example, spray, colloid), gases, and mixtures thereof (for example, paint). Moreover, conductive materials, magnetic materials, optical film forming materials, antibacterial materials, and antistatic materials may be used alone or in combination as the film-forming material. The conductive materials and magnetic materials have electromagnetic wave shielding functions. Further, paint materials including conductive or magnetic paints can be used as the film forming material.

Also, liquids, or gases or mixtures of liquids, gases and solids under pressure can be used as the compressed fluid containing the film forming material. Also a mixture of film forming materials and compressed gas may be used as the compressed fluid. Examples of compressed gas are air, nitrogen, and inert gases such as argon. Further, for example, the compressed fluid containing the film forming material may be composed of a compressed gas made of compressed air at a pressure of 8 kg/cm or less, and a powder, granular or flake film forming material having a particle size in the range of 0.3 microns to 100 microns, preferably 0.5 microns to 100 microns. To improve the bonding force of the film forming material, a binder such as polyvinyl alcohol, acryl or polyurethane derivatives, resin for adhesion, or solvent may be contained in the compressed fluid. To control the concentration of the film-forming-material, a solvent for the film-forming-material may be included in the compressed fluid. A compressed fluid heated to a specified temperature may be also used. By using a heated, compressed fluid, molding and bonding of the film to the forming material are made easier, which in turn promotes curing of the molded product.

The timing of supplying the film forming material onto the blow molding material (parison) or pressure forming material is as follows. First, the film-forming-material is supplied on the surface of the forming material or in the parison. Then compressed gas is introduced to completely form the forming material or parison (not shown). Alternatively, a compressed fluid containing a film-forming-material is supplied and a product is partially formed. Then compressed gas is introduced to completely form the forming material (not shown).It is preferable to supply the compressed fluid containing the film forming material while the pressure forming material or blow molding material (parison) is in an adhesive state.

It is also possible to feed high pressure gas containing a film-forming-material after the molded forming material is solidified. The adhesion of the film may be slightly lowered, however, following these steps, as compared with the above-described method.

The paint which has a conductive or magnetic function is composed of a functional filler, a solvent, and a binder. The solvent is, for example, an alcohol, toluene, thinner or acetone. The binder is, for example, polyvinyl alcohol (PVA), epoxy resin, acrylic resin, vinyl chloride, acrylonitrile butadiene styrene resin (ABS), polystyrene resin (PS), polyamide resin, polycarbonate resin, styrene resin, polybutylene terephthalate resin, or other resins.

Examples of a conductive filler contained in the conductive material or conductive paint include one or more materials selected from silver, copper, brass, iron, zinc, aluminum, nickel, stainless steel, tin oxide and carbon. The conductive filler may be in the form of a powder, granules, flakes, and mixtures thereof, having a particle size in the range of 0.5 micron to 100 microns. The conductive filler used as conductive material and the conductive filler used as conductive paint are selected to have the desired size and shape, respectively. By feeding the compressed fluid containing the conductive filler (particle size about 1 to 5 microns) onto the surface of the forming material or parison, a conductive film is formed.

The magnetic filler contained in the magnetic material or magnetic paint includes, for example, ferrite, ferrite compounds, silicon, iron, nickel, cobalt, samarium, cerium, and mixtures thereof, and other magnetic metals. Further, the magnetic filler includes magnetic alloys such as iron-silicon, iron-nickel, iron-cobalt, and iron-aluminum. The magnetic filler may be, for example, in the form of a powder, granules and flakes having a particle size of 0.5 micron to 100 microns. The magnetic filler used as magnetic and magnetic filler used as magnetic paint are selected to have the desired size and shape, respectively.

The conductive film formed by using conductive member or conductive paint functions to reflect electromagnetic waves. By contrast, the magnetic film formed by using magnetic material or magnetic paint absorbs electromagnetic waves. Thus, the conductive film and magnetic film function to shield electromagnetic waves.

An optical functional film formed with an optical material is used for the purpose of cutting ultraviolet rays and infrared rays, or preventing reflection. The optical material may be in the form of gas, liquid, fine powder dispersed in paint, or other forms. In the case of a gas, for example, by means of chemical vapor deposition (CVD), a gas such as conductive tin oxide or conductive indium oxide is introduced into the parison, and an optical functional film is formed at a specific temperature. For example, temperatures around 160° C. are suitable. Or, by silicon dioxide($SiO_2$) sputtering or other means, a silicon oxide film is formed. Moreover, a compressed fluid containing a paint composition including, fine powder of conductive tin oxide or conductive indium oxide is introduced onto the surface of the forming material or parison, and a conductive film is formed by maintaining the temperature around 160° C. for several seconds to several minutes. In the case of a liquid, for example, as liquid material containing silicon oxide, a high pressure gas containing a product of Samco International Institute (see Nippon Keizai Shimbun, Jun. 17, 1995) or the like is introduced onto the surface of forming material or parison, and a functional film is formed at a temperature in the range of ambient temperature to around 350° C.

As the antistatic material, nonionic, anionic, cationic, or amphoteric surface active agents may be used. Examples of nonionic surface active agents include polyoxyethylene aLkylamine, polyoxyethylene alkylamide, polyoxyethylene alkylether, polyoxyethylene alkylphenyl ether, glycerin fatty acid ester, and sorbitan fatty acid ester. Examples of anionic surfaces active agent include alkyl sulfonate, alkylbenzene sulfonate, alkyl sulfate, and alkyl phosphate. Examples of cationic surface active agents include quaternary ammonium chloride and quaternary ammonium sulfate.

Examples of amphoteric surface active agents include alkyl betaine, alkyl imidazoline and alkyl alanine. The compressed fluid containing the spray or liquid antistatic materials is introduced onto the surface of forming material or parison, and an antistatic film is formed.

As the antibacterial material, zeolite, chitosan, yomogi and hinoki (Japanese cypress) may be used. Zeolite is effective to eradicate the habitat of the depositing bacteria by mixing therewith about 1 to 10% of antibacterial creams containing bactericidal substance such as silver, copper and zinc in plastics such as polypropylene. Chitosan is a natural polysaccharide contained largely in the shells of crabs and shrimp, and has antibacterial and antifungal properties. A compressed fluid or paint containing about 0.1% to about 10% of fine powder of chitosan having a particle size of about 5 microns or less is introduced onto the surface of the forming material or parison. Yomogi contains tannin, which has anti-allergic and anti-itch effects. In addition to chlorophyll, yomogi contains substances which have bactericidal and bacteriostatic effects. A compressed fluid or paint having a particle size of about 0.5 micron to about 20 microns, and containing extract of yomogi is introduced onto the surface of the forming material or parison. Hinoki contains tropilone, which is an aseptic that kills bacteria and fungi. Like other antibacterial materials, yomogi is used as a microcapsule having a particle size of several microns.

Specific embodiments of the invention are described below.

Embodiment 1

In this embodiment, a blow molding method for forming a molded product having a hollow double wall structure and an enclosed hollow inside, the molded product, and the manufacturing apparatus are disclosed.

Figure 3:
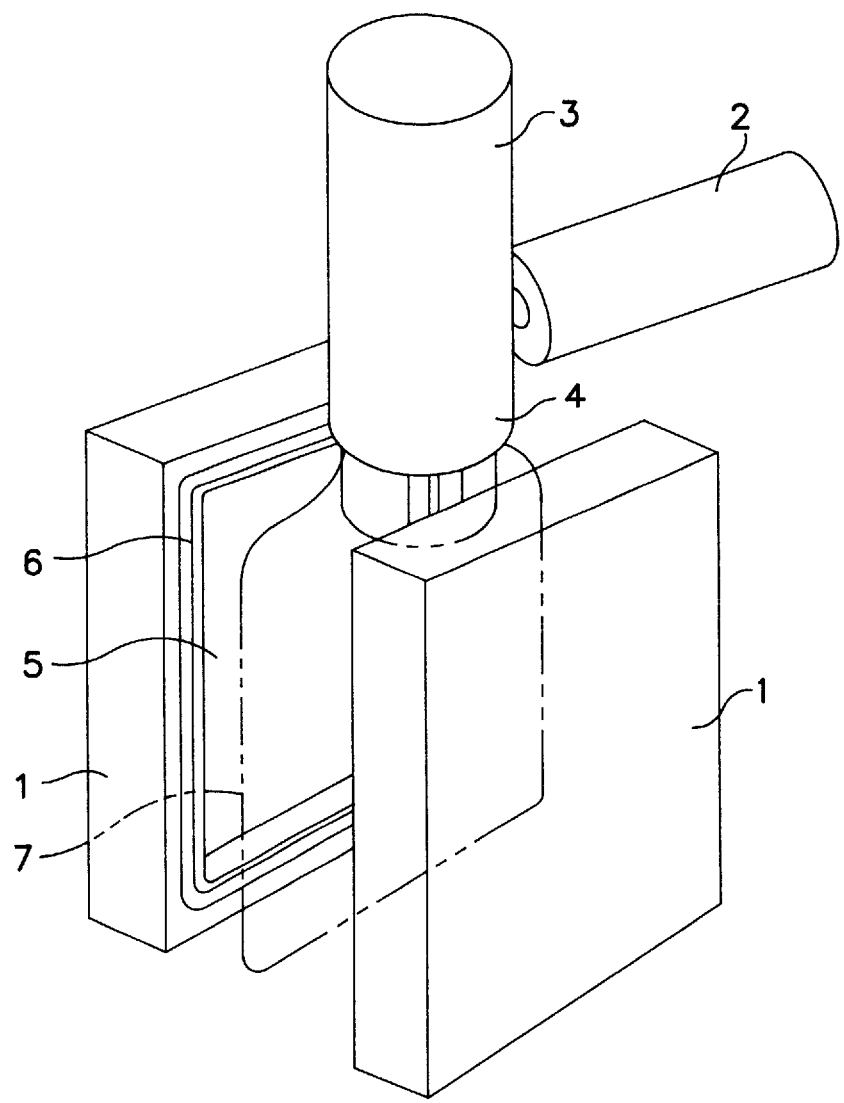
FIG. 3 is a perspective view showing one embodiment of a blow molding apparatus according to the invention.
Figure 4:
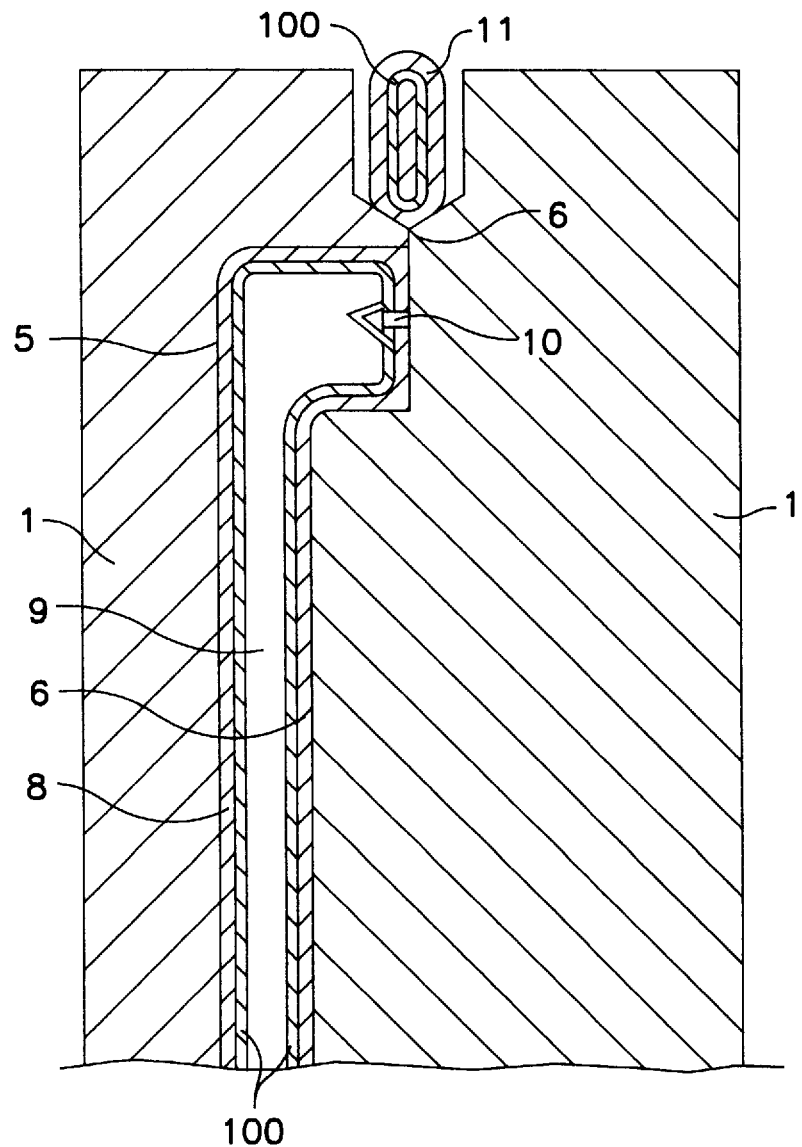
FIG. 4 is a cross-sectional view of a die for the apparatus shown in FIG. 3.
Figure 5:
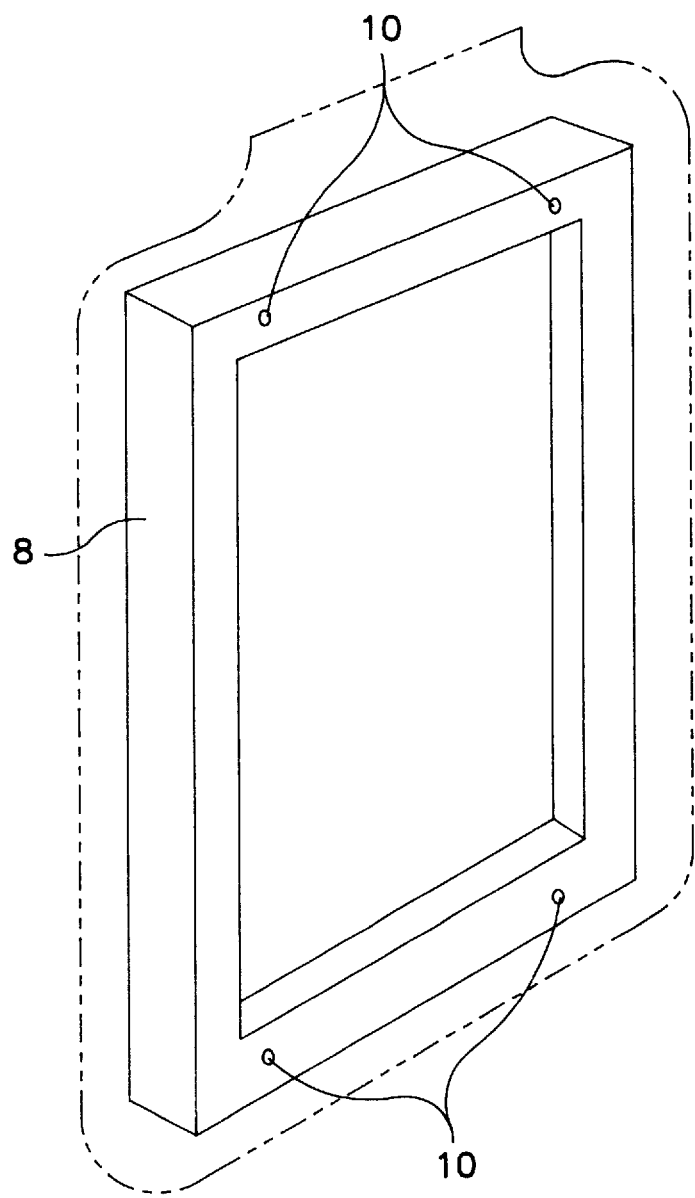
FIG. 5 is a perspective view of a molded product according to the invention manufactured by using the blow molding apparatus shown in FIG. 3.
Figure 6:
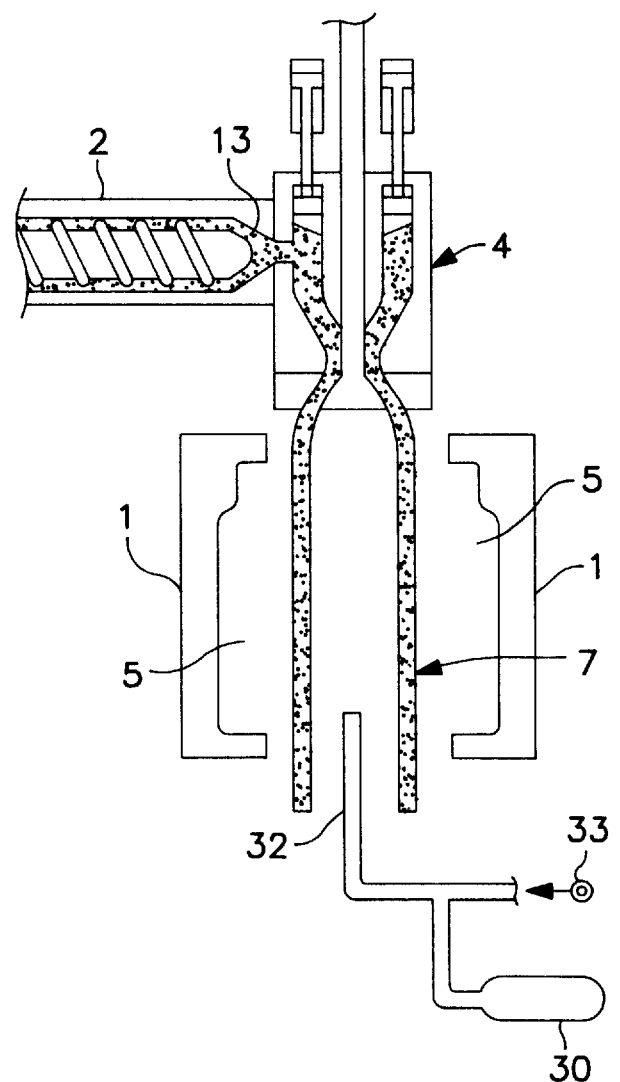
FIG. 6 is a schematic diagram of another embodiment of a blow molding apparatus according to the invention.
Figure 7:
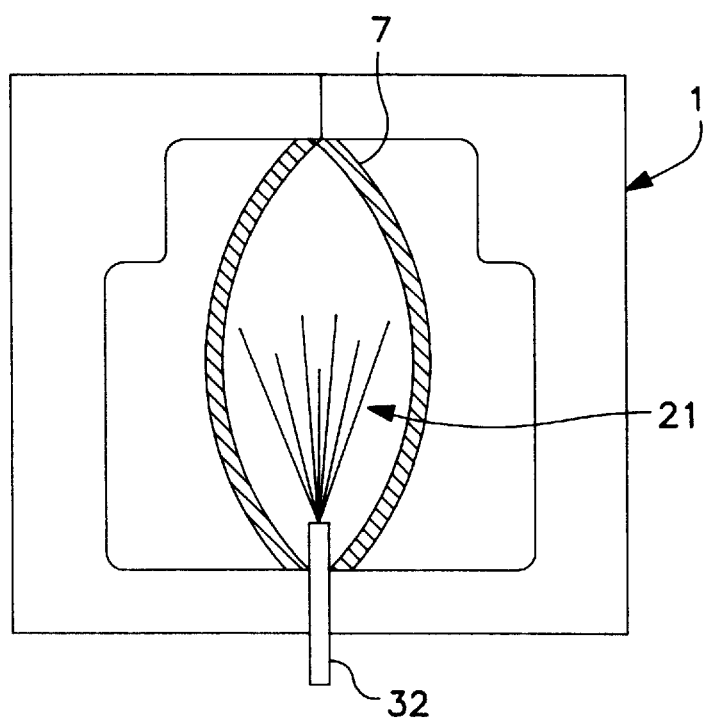
FIG. 7 is a cross-sectional view of the apparatus shown in FIG. 6.

FIG. 3 is a perspective view showing a blow molding method and blow molding apparatus for molding a housing according to the invention. FIG. 4 is a cross-sectional view of a die for blow molding. In use, a plasticized parison is supplied into the die, and a compressed fluid containing a film-forming-material is fed into the parison. FIG. 5 is a perspective view of a blow molded product. FIG. 6 is a diagram showing the construction of another embodiment of a blow molding apparatus according to the invention. FIG. 7 is a cross-sectional view of the apparatus shown in FIG. 6 with the die in a closed position for feeding a compressed fluid containing a film forming material into a parison.

In FIGS. 3, 4 and 6, a thermoplastic resin 13 (for example, a PS resin or an ABS resin) is melted in an extruder 2, and the plasticized resin material is accumulated in an accumulator 3. As a consequence, a parison 7 made of plasticized resin is extruded from an extrusion head 4. The parison 7 is positioned so as to spread to the outer periphery of a pinch-off part 6 between the patterns of an opened split die 1. In a cavity 5, a metallic conductive terminal pin (not shown) buried in the housing is set. The conductive terminal pin has a tapered end, and penetrates through the parison wall, and is conductively connected to the film-forming-material buried in the parison inner wall. The terminal pin becomes an electrically grounding terminal.

Next, the split die 1 is clamped into position. At this time, the whole periphery of the parison 7 is separated from the extruder by the pinch-off part 6. At this point, the apparatus is ready to perform the blow molding process. The compressed fluid composed of the film-forming-material and compressed gas is introduced into the parison 7. The film-forming-material is electromagnetic wave shielding material composed of, for example, metal powder alone, such as nickel, copper and silver having a particle size range of 0.5 to 100 microns, or a mixture of such metal powders and a binder such as acryl and polyurethane. In FIG. 6, the material feeding means is composed of a compressed gas source 33, a pump 30 for feeding the film-forming-material, and a blow pin 32. In the Blow pin 32 enters the closed die through the suitable opening in the walls of die 1 and is inserted into the parison 7. Then, as shown in FIG. 7, compressed fluid 21 containing the film-forming-material is introduced into the parison 7.

The parison 7 expands along the shape of the cavity 5 of the split die 1. Thus, the hollow part 9 of the housing 8 and the film 100 having an electromagnetic wave shielding function are formed simultaneously with the forming of the parison as shown in FIG. 4. In this process, the conductive terminal pin 10 is buried in the wall of the housing 8. Clamping of the die 1 also may be executed after introducing the film-forming-material.

The housing 8 which was blow molded in this process is formed as shown in FIG. 5. The whole periphery of the housing 8 has a thin wall part which is formed by the pinch-off part 6. The burr 11 is positioned outside of this thin wall part and is removed in the deburring process. The housing 8 in the shape as shown by solid lines in FIG. 5 is obtained.

The mean wall thickness of the housing 8 is 2.3 mm, and the film thickness of the film 100 is in a range of about 1 micron to about 800 microns. Where the film includes a metal powder alone, the film thickness of the film 100 is about 1 micron to about 50 microns, and where the film includes a mixed material of a metal powder and binder, the film thickness of the film 100 is about 20 microns to about 100 microns.

Thus, in this embodiment, in the housing 8, simultaneously or parallel with blow molding of the outer form of the structure, the film 100 having electromagnetic wave shielding characteristics can be formed on the inner surface of the housing 8. In this way, the productivity of the apparatus can be increased. Moreover, since the film 100 is not exposed to the surface, the structure has excellent design characteristics.

In this embodiment, it is preferred that the compressed fluid containing the film forming material be supplied before the parison is solidified. It is also possible, however, to supply the film forming material after the parison is solidified. In the latter case, it is preferred to mix an adhesive material preliminarily in the film-forming-material before forming the film 100.

As the film-forming-material, a conductive paint also may be used. It is further possible to supply a high pressure gas containing film-forming-material by heating the gas to a specific temperature.

A process of blow molding by feeding only the compressed gas and a process of forming a film by feeding only compressed gas containing a film-forming-material member onto the inner surface side of the hollow part may be executed sequentially and separately, or in reverse sequence. That is, the compressed gas for molding, and compressed gas containing film-forming-material may be separately supplied into the parison.

In this embodiment, instead of using a resin material to form the parison, a glass material or ceramic material also may be used.

Embodiment 2

Figure 8:
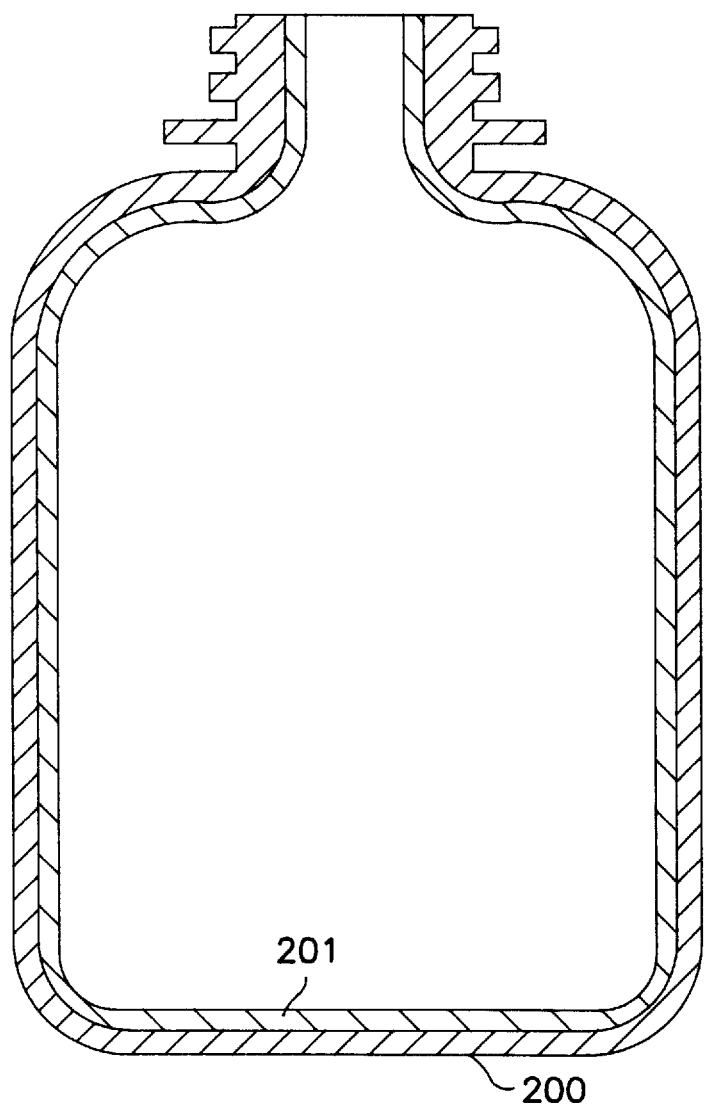
FIG. 8 is a cross-sectional view of another molded product produced by the apparatus and method shown in FIG. 3.

As another embodiment of the invention, FIG. 8 shows a sectional view of a beverage bottle container manufactured by a blow molding process according to the invention. In FIG. 8, a film 201 functioning as a gas barrier or which prevents ultraviolet rays is formed inside of a bottle 200 which is made of polyethylene terephthalate.

The beverage bottle forming such film 201 may be manufactured by the same method as described in Embodiment 1 by changing the shape of the die.

Embodiment 3

Another embodiment of the invention relates to a blow molding method of manufacturing a parabolic antenna for a broadcasting satellite antenna or communication satellite antenna for receiving signals from artificial satellites.

Figure 9:
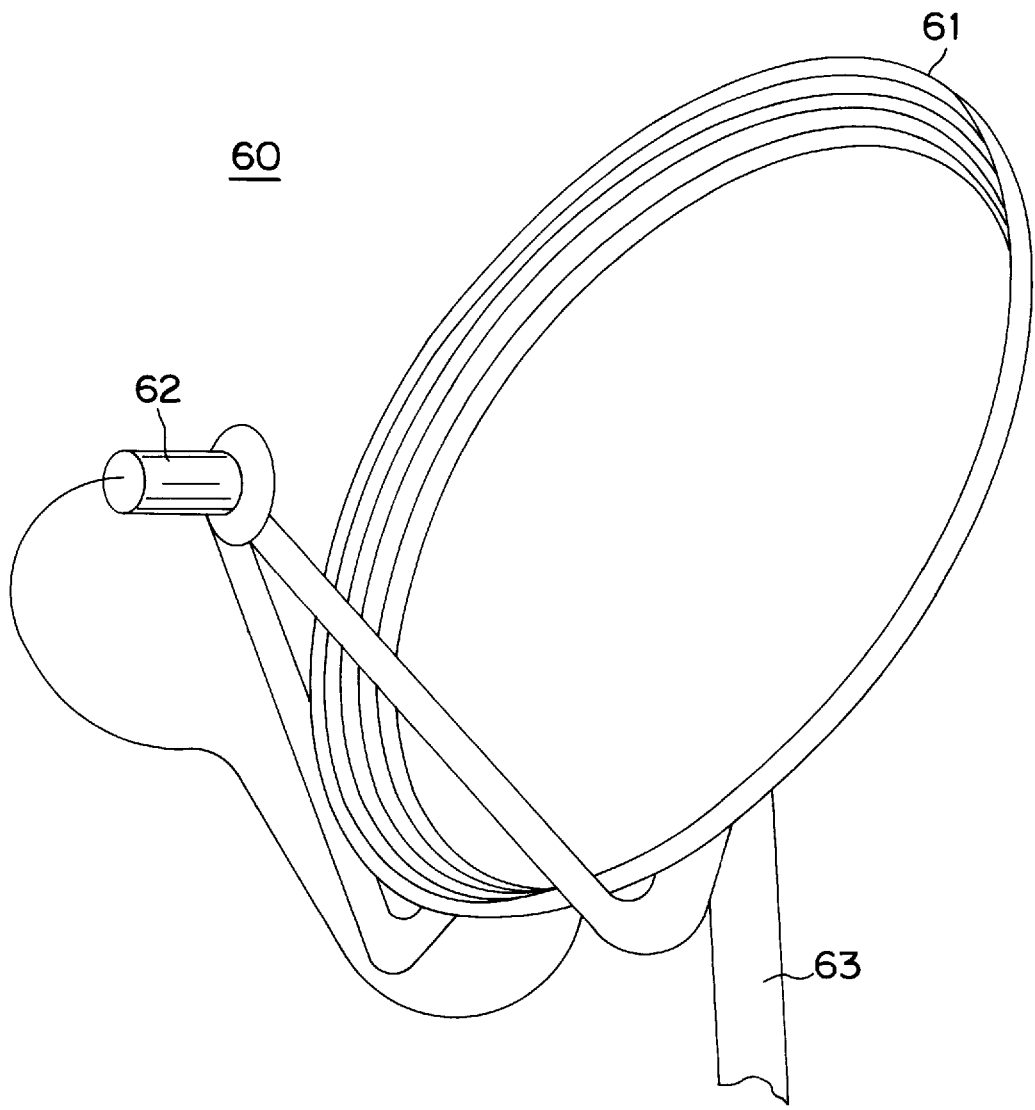
FIG. 9 is a perspective view of a parabolic antenna produced according to the invention.

FIG. 9 shows a perspective view of a parabolic antenna. In FIG. 9, a parabolic antenna 60 is composed of a reflector 61, converter 62, and a support 63.

Figure 10:
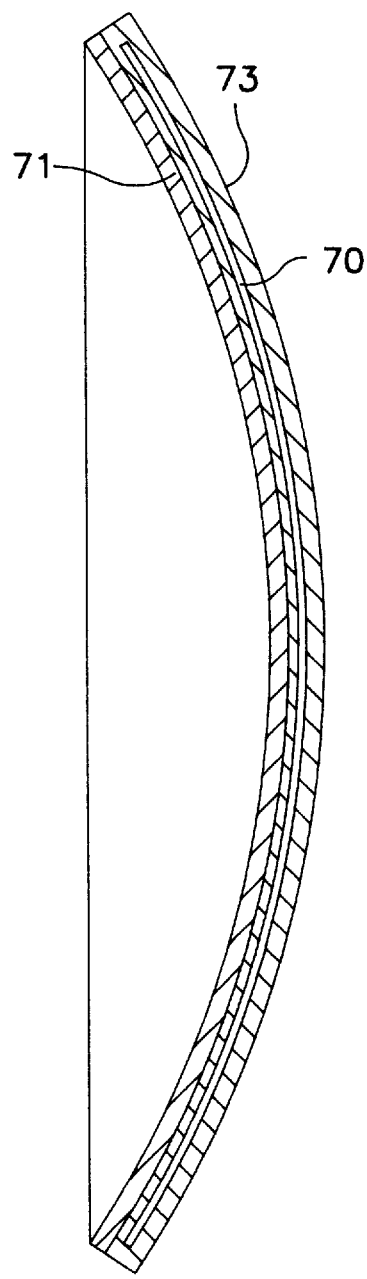
FIG. 10 is a cross-sectional view of a reflector produced according to the invention.

FIG. 10 is a cross-sectional view of the reflector 61 showing the double wall structure. The reflector 61 is composed of a substrate 73 formed like a dish, a conductive film layer 70 having a thickness of about 200 to 500 microns and formed adjacent to the substrate 73; and a weatherable protective film layer 71 having a thickness of about 10 to 50 microns and formed adjacent to the outer surface of the substrate 73.

Figure 11:
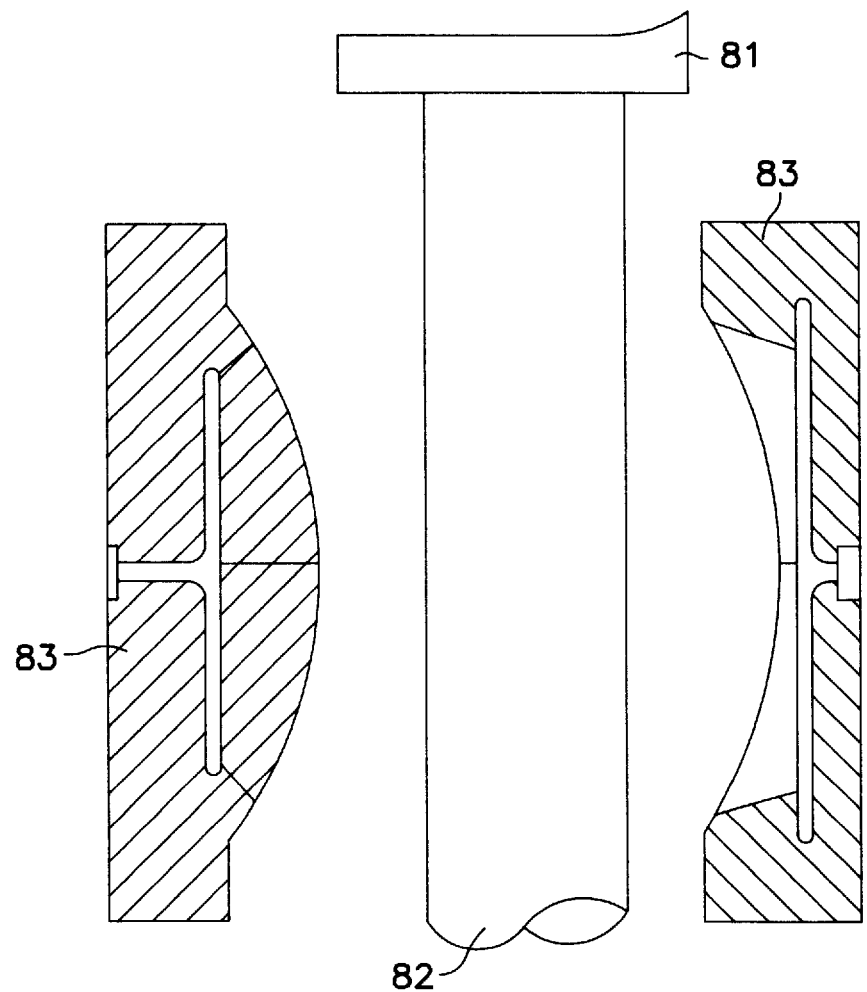
FIG. 11 is a fragmentary view partially in cross-sectional view showing another embodiment of a blow molding apparatus according to the invention.

FIG. 11 is a partial fragmentary partial cross-sectional view of a blow molding apparatus for manufacturing the reflector 61 shown in FIG. 10. In the molding step, the process for preparing the conductive film layer 70 for reflecting radio waves in the reflector 61 is the same as the process for forming the housing 8 shown in FIGS. 3 to 7. That is, in FIG. 11, a parison 82 is extruded from an extrusion head 81 between the patterns of a split die 83. Then the sections of the split die 83 are clamped together. Then, before the parison 82 is solidified, a compressed fluid containing a material for reflecting radio waves is injected into the hollow part of the parison 82 (not shown). At this time, a molded pre-product forming a concave-shape is formed by the pressure of the compressed fluid. Also, a radio wave reflection film is formed on the hollow part at the same time. In this way, the reflector having the radio wave reflection film on the inside is formed. In this embodiment, clamping of the split die 83 also may be executed after injection of the compressed fluid. Then by applying a paint, the protective film layer 71 is formed.

The reflector prepared according to this embodiment, unlike the conventional reflector manufactured by insert molding, does not require the disposition of a metal foil on the concave side surface of the reflector or preparing the metal film by spraying or atomizing.

The reflector 61 is formed from a substrate which includes, for example, acrylic resin, acrylonitrile-butadiene-styrene resin, polypropylene resin, denatured polyphenylene resin, and denatured polyphenylene ether resin.

The protective film layer 71 includes, for example, vinyl resin, acrylic resin, polyamide resin, epoxy resin, rubber resin, urethane resin, fluoroplastics, and resins containing titanium or other fillers.

The conductive film layer 70 includes, for example, brass, stainless steel, copper, iron, nickel, zinc, aluminum, aluminum alloys, and other materials which reflects radio waves.

Embodiment 4

Next are described a molded product having a recess, a pressure forming method of a molded product having a film on the inner side of the recess, and an apparatus for forming the molded product.

Figure 12:
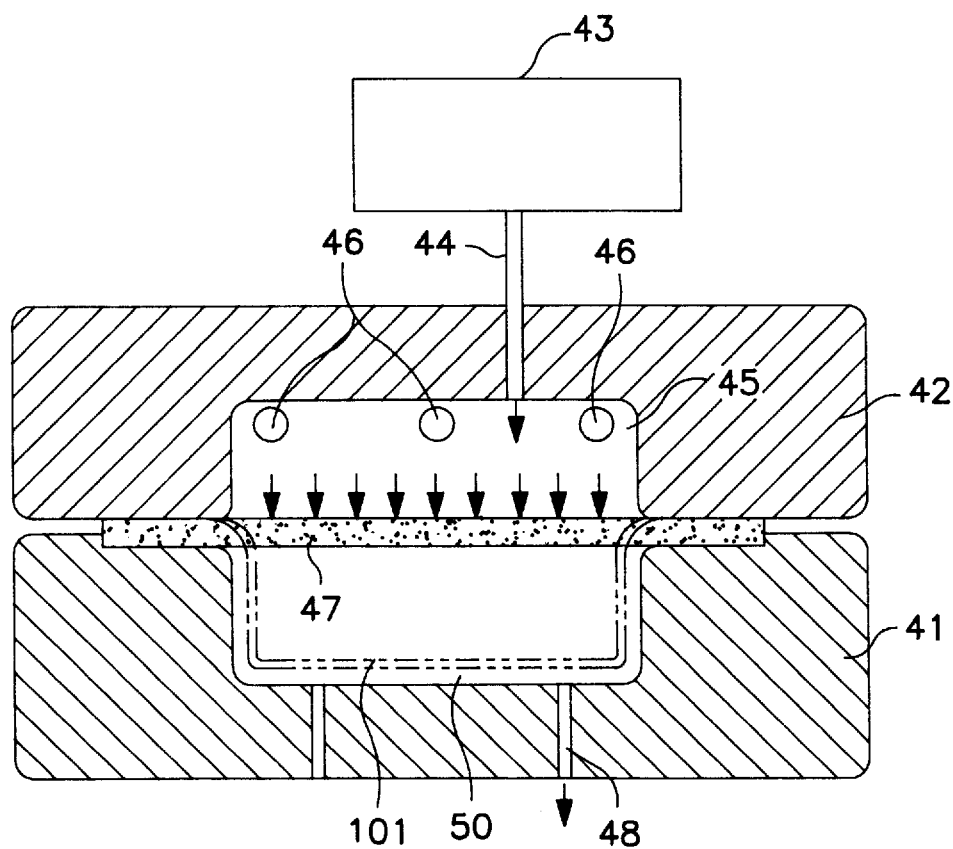
FIG. 12 is a cross-sectional view showing another embodiment of a pressure forming apparatus according to the invention.

FIG. 12 is a cross-sectional view showing a pressure forming apparatus and a pressure forming method according to the invention. In FIG. 12, a stationary die 41 for forming the recess incorporates at least one heater (not shown) to heat the die 41 to a specific temperature. A movable die 42 confronts the stationary die 41, and a plate forming material 47 is placed between the movable die 42 and the stationary die 41. The movable die 42 presses and holds the peripheral edge of the forming material 47 as specified, and includes at least one heater 46 disposed in a recess of the movable die 42. The heater 46 heats and softens the forming material 47.

The movable die 42 has a feed tube 44, and through the feed tube 44, a compressed fluid containing a film-forming-material for example, electromagnetic wave shielding material is fed into the cavity from a compressed fluid feed device 43.

As required, meanwhile, the air in the cavity of the stationary die 41 can be removed by a vacuum suction device (not shown) through an air vent 48. By removing air from the cavity, ease of forming the molded product and the stability of formed shape may be increased.

The compressed fluid containing the film forming material is introduced into the recess of the movable die 42 and presses the forming material 47 into softened state. The forming material 47 is tightly fitted along the cavity shape of the stationary die 41, and a molded pre-product is obtained. That is, the molded pre-product corresponding to the shape of the cavity formed. Simultaneously with forming of the molded pre-product, in the forming step, a film 101 is formed in a specified film forming step of the forming material 47, a film 101 is formed to a specified film thickness (for example, several microns to 100 microns) on the molded pre-product side contacted by the compressed fluid. That is, film 101 is formed on the inside of the recess as shown in FIG. 4.

After solidifying the molded product, the die is opened, and the molded product 50 is taken out, so that the molded product having a formed film is obtained.

In this embodiment of the invention, the film-forming-material also may be supplied at different times in the process. For example, the compressed gas may be supplied, on the surface of the softened forming material causing the forming material to be molded into a pre-product of a specific shape. Then the film forming material is supplied before the molded pre-product is solidified. The compressed gas is supplied through the feed tube 44.

The film-forming-material may be also supplied after the molded pre-product is solidified. In this case, it is preferred to place an adhesive material on the surface of forming material.

When forming a film on the surface of the molded pre-product by contacting the inner side with the compressed fluid, it is also possible to form a film by introducing into the cavity a compressed fluid composed of a film-forming-material (such as conductive material, magnetic material, paint material, optical functional material, and antistatic material) and a compressed gas, (such as compressed air or high pressure nitrogen gas).

As the film-forming-material, a paint such as conductive paint and magnetic paint also can be used as in Embodiment 1.

Also, the same materials as discussed in Embodiment 1 can be used as conductive materials and magnetic materials.

As the forming material, in addition to resins, glass material, ceramic material, (for example, green sheet), rubber material, leather material, and paper material can be used.

Molded products include optical lenses such as concave lens and convex lens, meniscus lens, and others. By using special organic materials or inorganic materials as the film forming material, an optical film is disposed on the lens surface by a chemical vapor deposition (CVD) technique or the like. The optical film includes, for example, a filter film for selecting a specific frequency, chromatic aberration preventive film, coloring paint, and reflection preventive film.

In the manufacturing process according to the invention, the step of pressure forming a molded pre-product by supplying a compressed gas into a forming material in a die, and the step of forming a film by supplying a film-forming-material on the inner side of the recess of the molded pre-product by contacting the inner side with the compressed gas, may be executed sequentially, or may be executed separately. That is, the compressed gas used to form the molded pre-product and the compressed gas containing the film-forming-material may be supplied into the die separately in different steps.

Thus, according to the blow molding method or pressure forming method in the invention, the following effects are brought about.

(1) A molded product of complex shape and having a functional film can be obtained depending on the purpose of use.

(2) In the molding process used to form the material, the functional film is formed simultaneously or in parallel with the molding process, and thus, the extra step of form the film is not necessary, and the manufacturing process is simple, and the manufacturing cost is reduced.

(3) Because a film is formed on the inside of the molded product, the appearance is not changed by the film, and peeling of film due to scratching or other mechanical contact can be prevented.

(4) It is not necessary to modify the forming material itself used in molding to provide the desired functions and qualities, and thus, a functional molded product is produced without having to change the properties of the forming material.

(5) A homogeneously functional film having a smooth surface can be formed on the inner surface of the hollow part.

Other various modifications are also possible according to the invention. For example, in Embodiments 1 to 4, the inner surface of the cavity of the die may be coated with silicon resin, silicon carbide, ethylene tetrafluoride, polyethylene, polyimide or the like, so that the forming material or film-forming-material will not stick to the die. The film-forming-material may be also include materials other than those mentioned above. Therefore, all changes and modifications existing within the true spirit and scope of the invention are included in the scope of the following claims.

What is claimed:

1. A method of blow molding a reflector for a parabolic antenna and forming a film which functions to reflect radio waves on an inside of said reflector, said method comprising the steps of:

(a) supplying a plasticized parison having a hollow part into a die;

(b) feeding a compressed gas into said hollow part of said parison which is within said die;

(c) feeding a material for forming the film, which functions to reflect the radio waves, into said hollow part of said parison before said parison is solidified, and forming a molded pre-product from said parison and disposing said material in the inside of said hollow part of said parison during the process of forming said molded pre-product, (d) solidifying said molded pre-product and said material disposed in the inside of said molded pre-product; and (e) forming said reflector for said parabolic antenna by said step (a) to said step (d).

2. The method of blow molding a reflector for a parabolic antenna according to claim 1, wherein said film is a conductive film.

3. A method for blow molding according to claim 1, wherein said material for forming the film is at least one selected from the group consisting of a powder, granules, flakes, liquid, and mixtures thereof.

4. A method for blow molding according to claim 1, wherein said film is conductive.

5. A method for blow molding according to claim 1, wherein said film is conductive, and said material is at least one selected from the group consisting of silver, copper, brass, iron, zinc, aluminum, nickel, tin oxide, stainless steel, and carbon.

6. A method for blow molding according to claim 1, further comprising the step of:

pressing said die which has a first die and a second die, in which said molded pre-product and said material in the inside of said hollow part of said parison are located, and forming a product of said reflector.

* * * * *

UNITED STATES PATENT AND TRADE MARK OFFICE
CERTIFICATE OF CORRECTION

PATENT NO.   : 5,827,469
DATED        : October 27, 1998
INVENTOR(S)  : Shimizu et al.

It is certified that error appears in the above-identified patent and that said Letters Patent is hereby corrected as shown below:

Cover page, item [30] Foreign Application Priority Data, "Apr. 10, 1995  Japan  7-838875" should read -- Apr. 10, 1995  Japan  7-083875--.

Column 12, line 31, delete "blow molding" and insert --forming--.

Column 12, line 34, delete "blow molding" and insert --forming a reflector for a parabolic antenna--.

Column 12, line 38, delete "blow molding" and insert --forming a reflector for a parabolic antenna--.

Column 12, line 40, delete "blow molding" and insert --forming a reflector for a parabolic antenna--.

Column 12, line 45, delete "blow molding" and insert --forming a reflector for a parabolic antenna--.

Signed and Sealed this

Fourteenth Day of September, 1999

Attest:

Q. TODD DICKINSON

*Attesting Officer*     Acting Commissioner of Patents and Trademarks